United States Patent [19]
Basile, II. et al.

[11] Patent Number: 5,558,573
[45] Date of Patent: Sep. 24, 1996

[54] METHOD AND MEANS OF SKINNING MEAT PRODUCTS

[75] Inventors: Vincent L. Basile, II., West Des Moines; Brent M. Veldkamp, Des Moines; Douglas N. McCloskey, Altoona; David S. Hamblin, Clive, all of Iowa

[73] Assignee: Townsend Eingineering Company, Des Moines, Iowa

[21] Appl. No.: 443,125

[22] Filed: May 17, 1995

[51] Int. Cl.⁶ ........................................................ A22B 5/16
[52] U.S. Cl. ............................................................. 452/127
[58] Field of Search ..................................... 452/127, 125

[56] References Cited

U.S. PATENT DOCUMENTS

| | | | |
|---|---|---|---|
| 3,360,026 | 12/1967 | Schill | 452/127 |
| 3,513,893 | 5/1970 | Townsend | 452/127 |
| 3,542,105 | 11/1970 | Townsend | 452/127 |
| 3,559,707 | 2/1971 | Townsend | 452/127 |
| 3,733,997 | 5/1973 | Beasley | 452/127 |
| 3,892,010 | 7/1975 | Bartels et al. | 452/127 |
| 4,188,870 | 2/1980 | Schill | 452/127 |
| 4,408,519 | 10/1983 | Schill | 452/127 |
| 4,466,344 | 8/1984 | Schill | 452/127 |
| 4,730,368 | 3/1988 | Toiwnsend | 452/127 |
| 4,920,875 | 5/1990 | Schill | 452/127 |
| 5,236,323 | 8/1993 | Long et al. | 452/127 |

FOREIGN PATENT DOCUMENTS

| | | |
|---|---|---|
| 7827230 | 4/1980 | France . |
| 3213730A1 | 4/1982 | Germany . |
| 3216150A1 | 4/1982 | Germany . |
| 8212461.2 | 4/1982 | Germany . |
| 3303280A1 | 1/1983 | Germany . |
| 93110809.6 | 2/1994 | Germany . |

Primary Examiner—Willis Little
Attorney, Agent, or Firm—Zarley, McKee, Thomte, Voorhees, & Sease

[57] ABSTRACT

The machine for skinning meat has a frame, an input conveyor, a gripper roll, a skinning blade assembly comprising a shoe with a skinning blade thereon, a hold down roll to apply downward pressure on a meat product to be skinned, and an outlet conveyor. The skinning blade assembly is supported on a pair of control arms that can be selectively positioned by cam elements to place the blade assembly in a desired position with respect to the gripping roll. A pair of sensor controlled air cylinders are secured to the control arms to move the blade skinning assembly with respect to the gripping roll. A cam controls the attitude of the blade gripping assembly as it is moved with respect to the gripping roll. The hold down roll is mounted on a pair of arms which are also controlled by a pair of sensor controlled air cylinders. The arms of the held down roll are linked to the control arms so that the hold down roll and the blade skinning assembly can be moved together wherein the hold down roll will not ever engage or encounter the gripping roll or the skinning blade assembly.

28 Claims, 7 Drawing Sheets

METHOD AND MEANS OF SKINNING MEAT PRODUCTS

BACKGROUND OF THE INVENTION

Skinning machines for skinning meat, poultry and fish products have long been in use. They typically include a toothed gripping roll, and an elongated skinning blade mounted in a shoe adjustable with respect to gripping roll. Typical skinning machines are shown in U.S. Pat. Nos. 3,559,707 and 4,730,368.

Existing skinning machines sometimes are wasteful in that too much meat material is left with the skin particularly when the operation commences. Starting the skinning operation, i.e., the initial engagement of the meat product with the skinning blade, is not always easy. Hold down rolls on the machines do not always apply sufficient pressure on the product to be skinned to enhance the skinning operation. High yield of the skinned product is not always achieved, and cleaning of the machine is often difficult.

It is therefore a principal object of this invention to provide a method and means of skinning meat products which will efficiently and effectively remove skin from meat, poultry and fish products.

It is a further object of this invention to provide a method and means of skinning meat products wherein air cylinders will effectively and efficiently control the position of the skinning blade assembly.

A further object of this invention is to provide a method and means of skinning meat products wherein the predetermined positions of the hold down roll and the skinning blade assembly are maintained even though both components are moveable during the skinning operation.

A further object of this invention is to provide a method and means of skinning meat products wherein the various functional and structural features of the skinning process are controlled by a computer.

A still further object of this invention is to provide a method and means of skinning meat products whereby the cleaning of the skinning machine can be easily accomplished.

A still further object of the invention is to provide a method and means of skinning meat products whereby the initial bite of the skinning blade into the meat product can be efficiently and effectively commenced.

A further object of this invention is to provide a meat skinning machine which can have the skinning blade assembly offset laterally to more efficiently skin meat products which have a variable thickness in a lateral direction.

A still further object of the invention is to have a meat skinning machine wherein the skinning blade assembly has a shoe with a compound arcuate surface having two arcuate portions with different radii.

A still further object of this invention is to provide a meat skinning machine with a hold down roll that applies vertical pressure to the center portion of the meat product being skinned, while directional pressure (downwardly and outwardly) is applied to the lateral portions of the product.

These and other objects will be apparent to those skilled in the art.

SUMMARY OF THE INVENTION

The machine for skinning meat has a frame, an input conveyor, a gripper roll, a skinning blade assembly comprising a shoe with a skinning blade thereon, a hold down roll to apply downward pressure on a meat product to be skinned, and an outlet conveyor. The skinning blade assembly is supported on a pair of control arms that can be selectively positioned by cam elements to place the blade assembly in a desired position with respect to the gripping roll. A pair of sensor controlled air cylinders are secured to the control arms to move the blade skinning assembly with respect to gripping roll. A cam controls the attitude of the blade gripper assembly as it is moved with respect to the gripping roll.

A hold down roll is mounted on the machine upstream of the gripping roll to apply down pressure on the meat product being skinned. The hold down roll is mounted on a pair of arms which are also controlled by a pair of sensor controlled air cylinders. The arms of the hold down roll are linked to the control arms so that the hold down roll and the blade skinning assembly can be moved together wherein the hold down roll will not ever engage or encounter the gripping roll or the skinning blade assembly.

The method of operation of the machine includes the skinning operation wherein the blade skinning assembly is instantaneously moved to a normal skinning position as soon as the presence of a meat product is sensed, and the initial bite of the cutting blade has been made with respect to the meat product to be skinned.

DESCRIPTION OF THE PREFERRED EMBODIMENT

The term "meat product" as used herein is understood to include not only meats but also chicken and fish.

Figures 1, 4, 5:
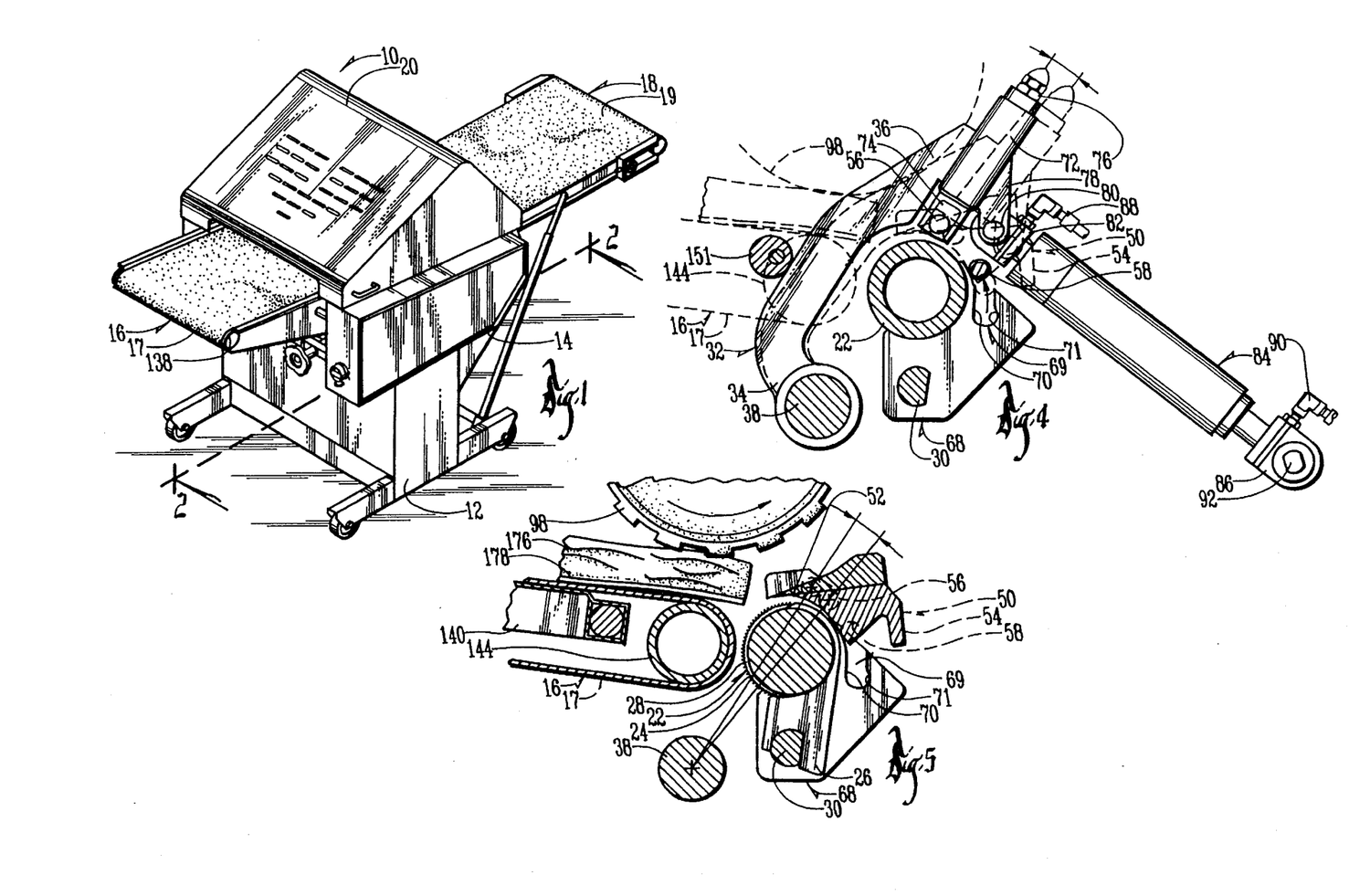
FIG. 1 is a perspective view of the skinning machine of this device.
FIG. 4 is an enlarged scale partial sectional view taken on line 4—4 of FIG. 3.
FIG. 5 is a partial sectional view taken on line 5—5 of FIG. 3.

With reference to FIG. 1, the numeral 10 designates the skinning machine of this invention which includes frame 12 and control compartment 14. Belt conveyor 16 utilizing continuous belt 17 is located at one end of machine 10, and an output belt conveyor 18 with a continuous belt 19 is located at the opposite end of machine 10. An upper housing or hood 20 is pivotally mounted on the frame 12 as will be described hereafter and generally covers gripping roll 22 (FIG. 3) and other operating components as will be further described. Gripping roll 22 has conventional gripping teeth 24. Conventional hook-shaped stripping elements 26 (FIG. 5) are mounted within grooves 28 and serve to strip the removed skin from the gripping roll. The lower ends of stripping elements 26 are conventionally secured against movement by retainer shaft 30 (FIG. 5) which extends laterally across frame 12.

Figures 2, 3:
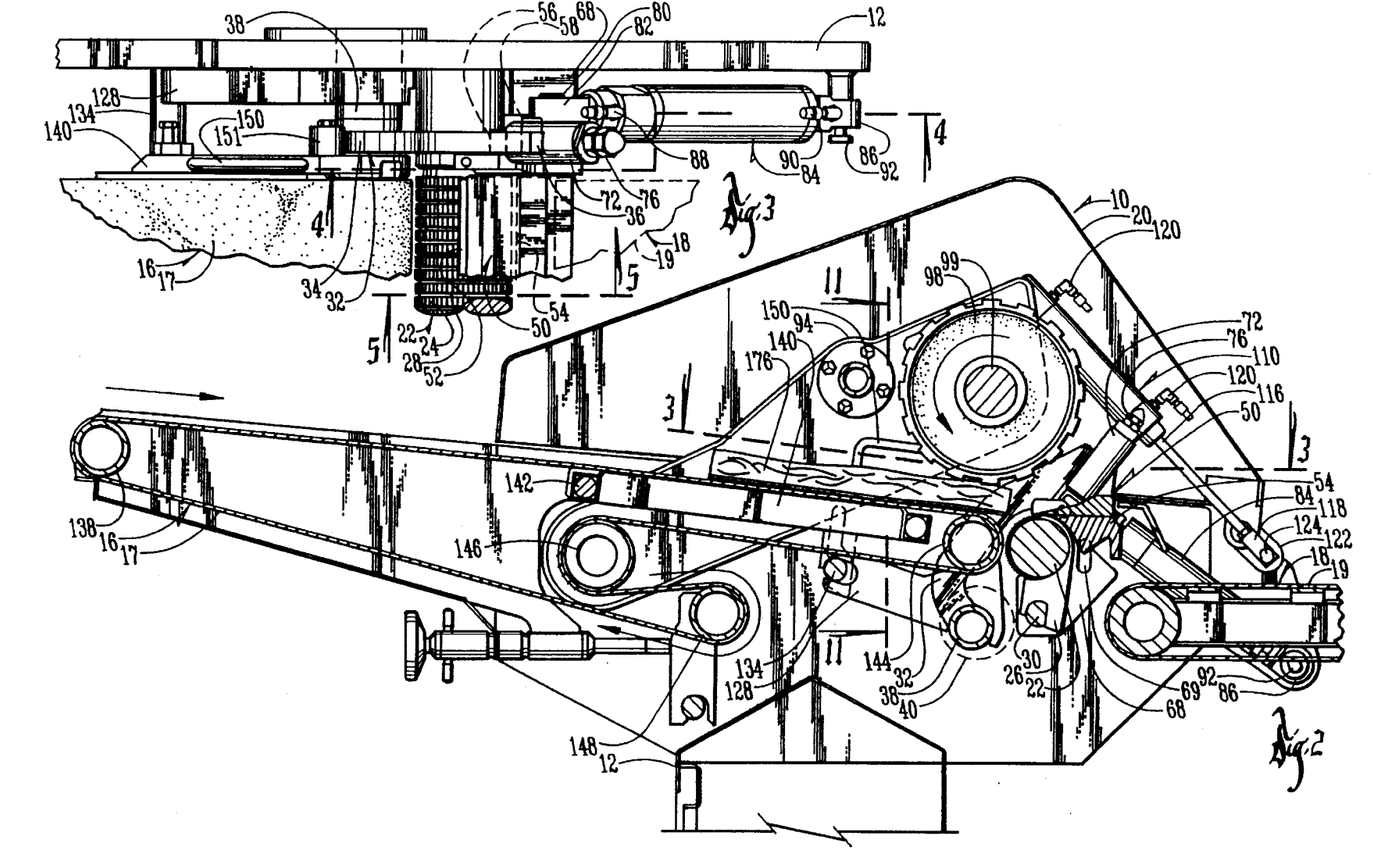
FIG. 2 is a large scale sectional view of the skinning machine taken on line 2—2 of FIG. 1.
FIG. 3 is a partial sectional view of the machine taken on line 3—3 of FIG. 2.
Figures 6, 7:
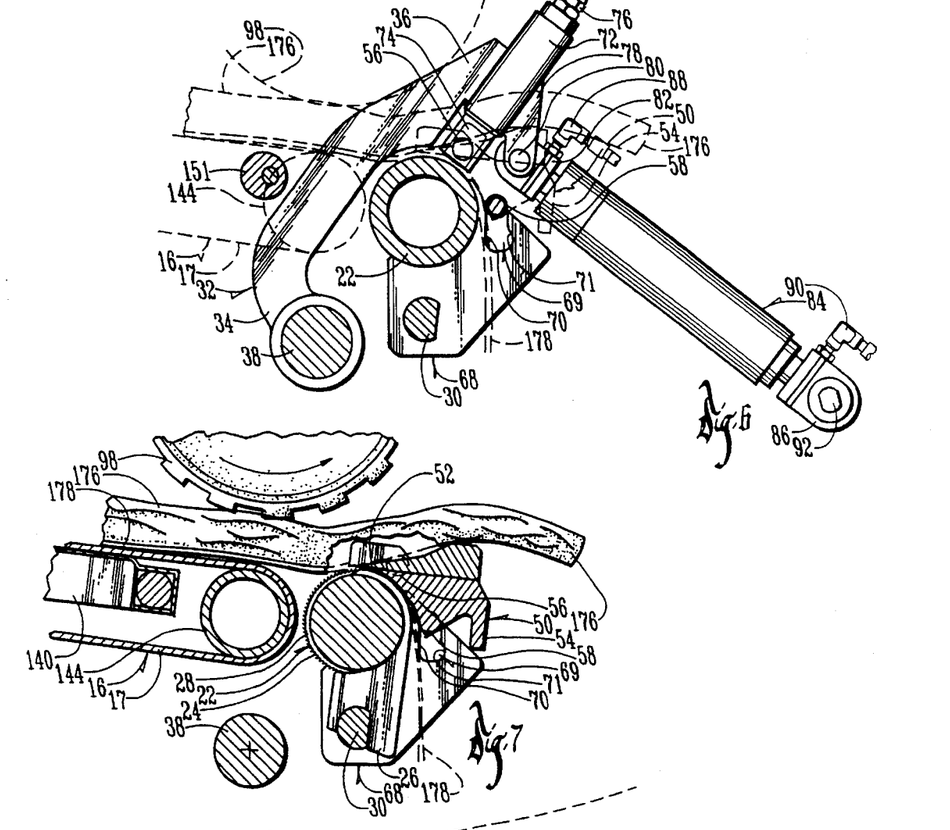
FIG. 6 is a partial sectional view similar to that of FIG. 4 but shows the structural components in a position immediately after the skinning operation has commenced.
FIG. 7 is a sectional view similar to that of FIG. 5 but shows the position of the skinning blade assembly at the same point in the skinning operation as contemplated by FIG. 6.

With reference particularly to FIGS. 3, 4 and 6, control arms 32 having lower ends 34 and upper ends 36 are pivotally secured to control arm shaft 38 which is pivotally secured by its ends on frame 12. A gear 40, (FIGS. 2, 12) has a plurality of peripheral teeth 42. An eccentric operating shaft 44 extends through frame 12 and has control wheel 46 on its outer end. A worm gear screw 48 is mounted on the inner end of shaft 44 and meshes with teeth 42. Gear 40 is rigidly secured to the mounting plate 49. Plate 49 is eccentrically secured to control arm shaft 38 so that when shaft 44 is rotated to cause gear 40 to rotate, shaft 38 will be rotated from one eccentric position to another.

Figures 12, 14, 15:
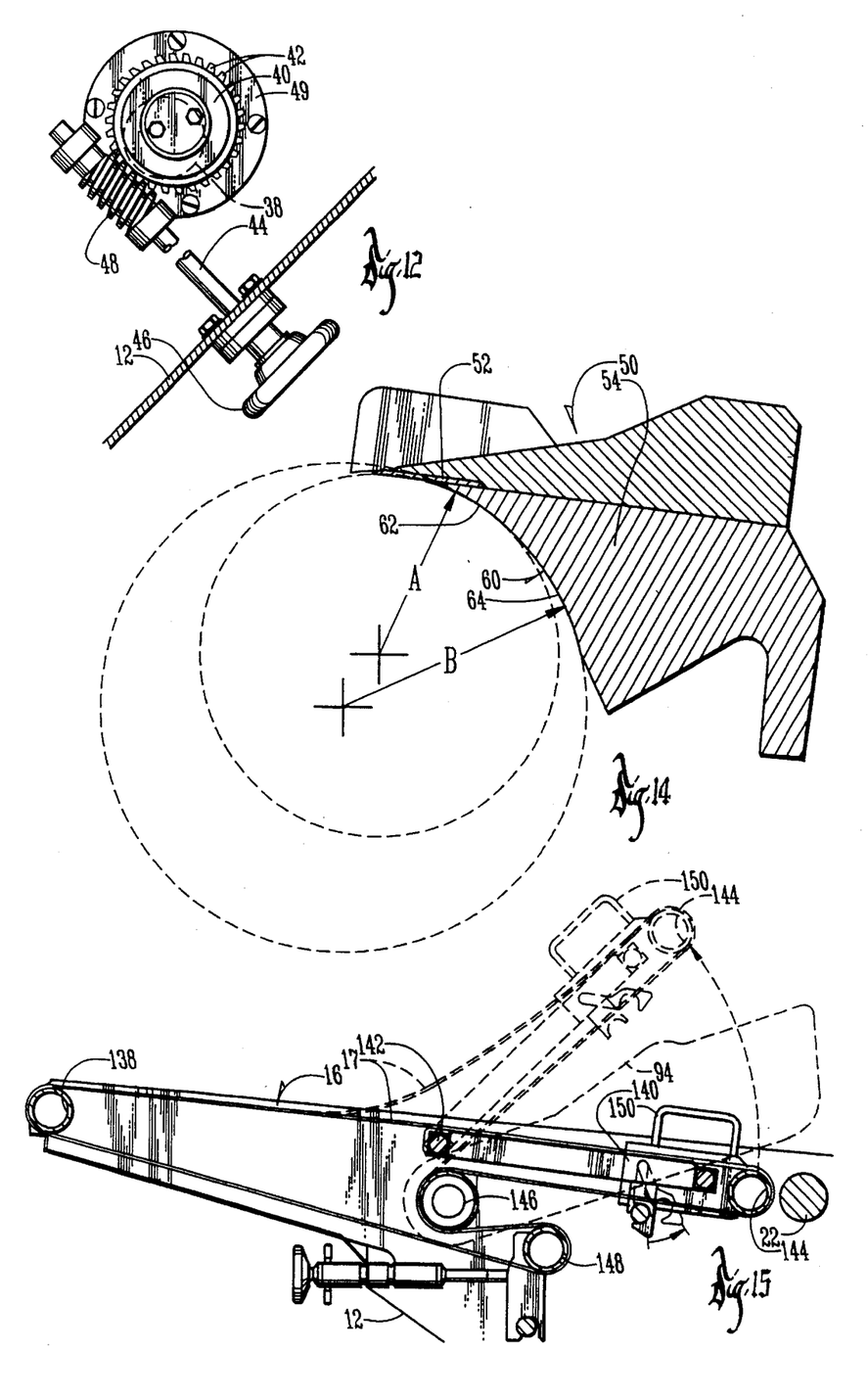
FIG. 12 is a large scale elevational view of the eccentric control for the control arms of the machine.
FIG. 14 is an enlarged scale sectional view of the shoe of the skinning blade assembly showing the separate arcuate surfaces thereon.
FIG. 15 is a side elevational view of the input conveyor.

A skinning blade assembly 50 is shown in FIG. 5 and includes a conventional elongated skinning blade 52 mounted on shoe 54. Shoe 54 has a pair of horizontal pins 56 and 58 extending outwardly from each end of the shoe (FIG. 4). As shown in FIG. 14, shoe 54 has a compound arcuate surface 60 with arcuate surfaces 62 and 64 having different radii. The radii of arcuate surface portions 62 is less than that of arcuate surface portions 64. The surface portion 62 and 64 are shown by the radius arrows A and B shown in FIG. 14.

Figure 8:
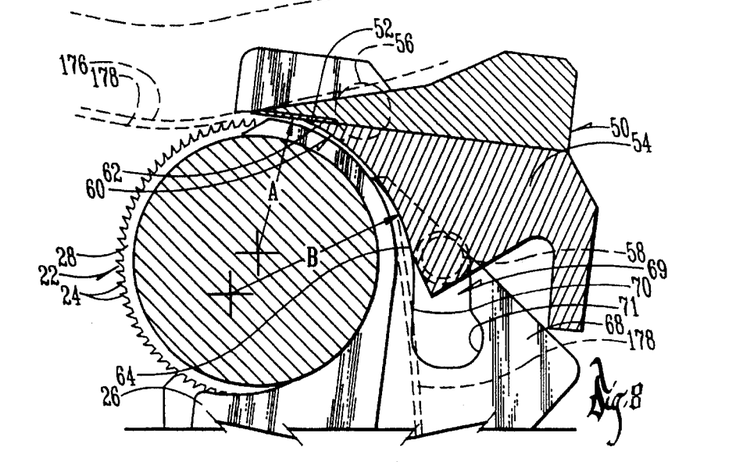
FIG. 8 is an enlarged scale sectional view taken through the gripping roll and the skinning blade assembly.

With reference to FIG. 8, cam blocks 68 are mounted on opposite sides of frame 12 at opposite ends of shoe 54. Blocks 68 each include a vertically disposed cam slot 69 which is adapted to receive pins 58 which extend from each end of the shoe. Cam slot 69 has a pair of cam surfaces 70 and 71. It should be noted that the width of cam slot 69 at its lower portion is slightly greater than at the upper portion thereof.

With reference to FIG. 6, shoe adjustment elements 72 are rigidly secured to each of the upper ends of control arms 32. Each element 72 includes an aperture 74 to receive one of the pins 56 extending from the ends of shoe 54. The numeral 76 designates an adjustment nut and bolt assembly associated with adjustment element 72. Elements 72 serve the purpose of limiting the upper movement of the skinning blade assembly 50 away from the gripping roll 22.

With reference to FIG. 6, ear 78 on the upper end of control arms 32 has an aperture to receive pivot pin 80 which also extends through suitable apertures in piston clevis 82 of air cylinders 84. A piston clevis 86 appears at the lower ends of air cylinders 84. Conventional air inlets 88 and 90 are located in the upper and lower ends, respectively, of cylinders 84 and are connected to a source of pressurized air (not shown). Pins 92 (FIG. 6) connect the lower ends of air cylinders 84 to frame 12.

Figure 11:
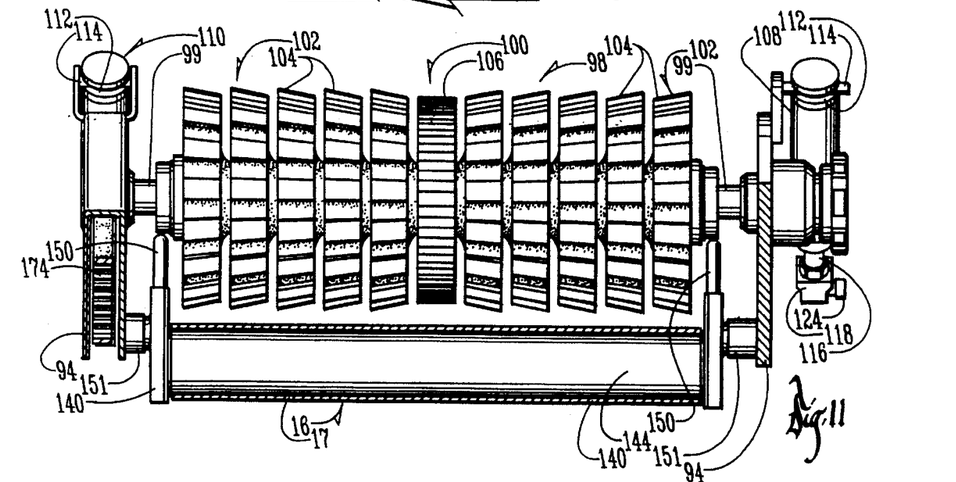
FIG. 11 is a large scale sectional view taken on line 11—11 of FIG. 2.

Hold down roll arms 94 (FIG. 13) are pivotally secured to plate 172. A hold down roll 98 similar to that shown in the U.S. Pat. No. 3,667,521 (FIG. 11) is supported by shaft 99 which is in turn supported by the hold down roll arms 94. Hold down roll 98 comprises a center portion 100 and end portions 102. Roller elements or disks 104 with laterally tapered peripheral portions are mounted on the end portions 102. A center disk 106 with a flat peripheral portion is mounted at the center portion 100 of the hold down roll 98.

Figure 13:
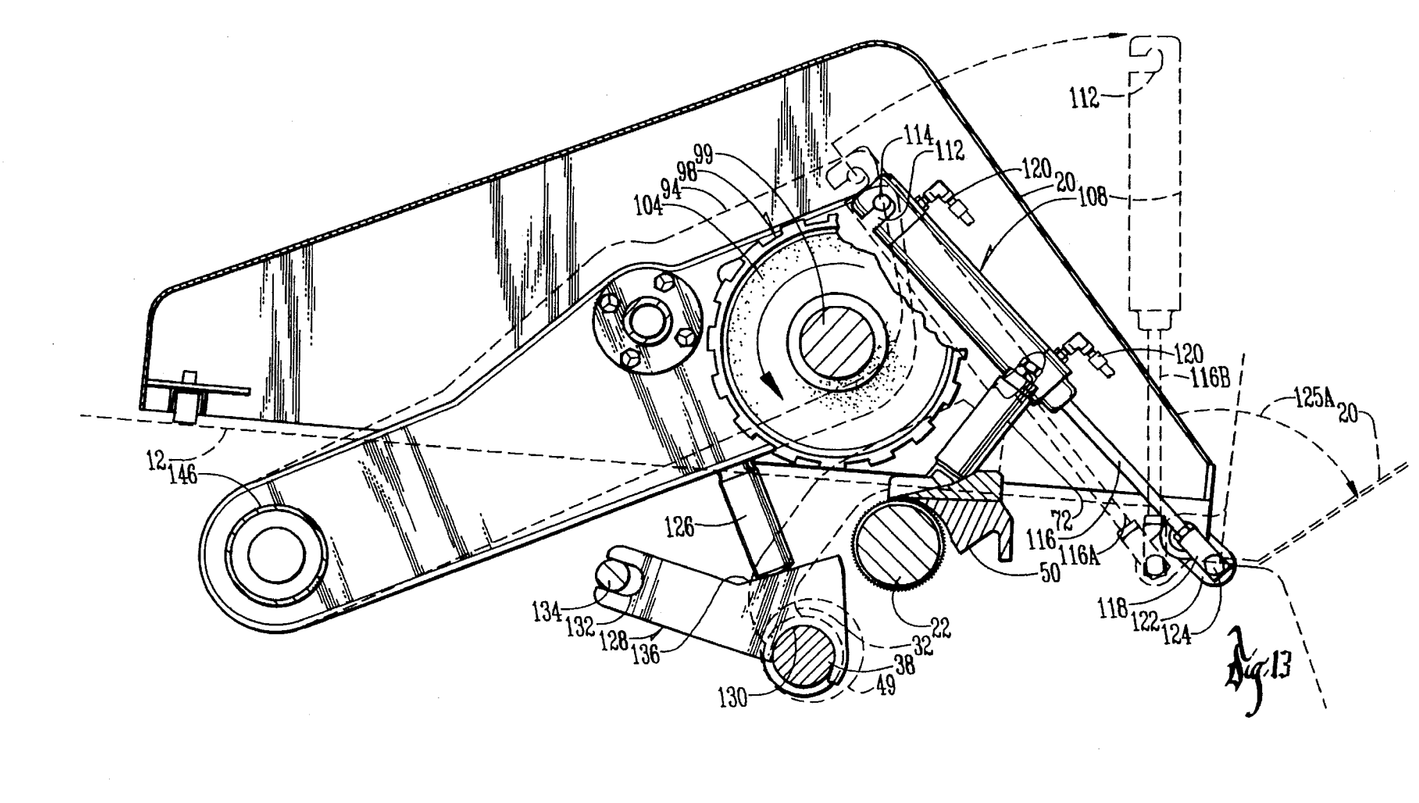
FIG. 13 is an enlarged scale partial sectional view showing the support arms for the hold down roll.

A pair of air cylinders 108 and 110 (FIGS. 11 and 13) each have a bayonet slot 112 at their upper ends which are adapted to engage pins 114 on the upper end of cylinders 108 and 110. Piston rods 116 extend downwardly out of the lower ends of cylinders 108 and 110 and terminate in clevis 118 (FIG. 13). Conventional air ports 120 are located at the upper and lower ends of cylinders 108 and 110. With reference to FIG. 13, stub arms 122 extend from hood 20 and are pivotally coupled by pin 124 to the clevis 118 located at the lower ends of each of the piston rods 116 of cylinders 108 and 110. When the hood 20 is opened, as indicated by the arrow 125A in FIG. 13, the piston rod 116 (as shown by the numeral 116A in dotted lines in FIG. 13) is moved upwardly to relieve the tension imposed thereon when the hood 20 is in a closed condition. By relieving this tension, the bayonet slots 112 at the upper end of air cylinders 108 and 110 can be disengaged from the pins 114 whereupon the cylinders can be moved to the vertical position shown by the dotted lines and the numeral 116B in FIG. 13 for movement to a disengaged position.

With reference to FIG. 13, an adjustable stop 126 has one of its ends adjustably secured to the lower portion of hold down roll arms 94. Stop 128 has a first arcuate notch 130 which is adapted to pivotally engage shaft 38. At the opposite end of stop 128 is located an arcuate notch 132 which is adapted to rotatably and slidably engage the horizontal rod 134 which extends laterally across the interior of the frame 12. The stop surface 136 engages the lower end of stop 126.

An input conveyor roll 138 (FIGS. 1 and 15) is mounted on frame 12. A belt frame 140 has one of its ends pivotally secured to frame 12 by shaft 142. Roll 144 extends laterally across the inner end of belt frame 140. Drive roll 146 is rotatably mounted on eccentric plates 172. Roll 148 is adjustably and rotatably mounted by its ends to frame 12. A handle 150 is mounted to frame 140. As seen in FIG. 15, the operator can pivot the frame 140 upwardly by grasping and pulling upwardly on handle 150 so that the conveyor belt 16 is moved upwardly to the position shown by the dotted lines in FIG. 15. Eccentric cams 151 (FIGS. 4 and 6) are adjustably mounted on frame 140 and bear against the rearward surface of control arms 32. By rotating the cams 151, the pivotal movement of the skinning blade assembly 50 with respect to the gripping roll 22 can be adjusted. The cams 151 in all instances limits the pivotal movement of the skinning blade assembly with respect to the gripping roll.

Figure 10:
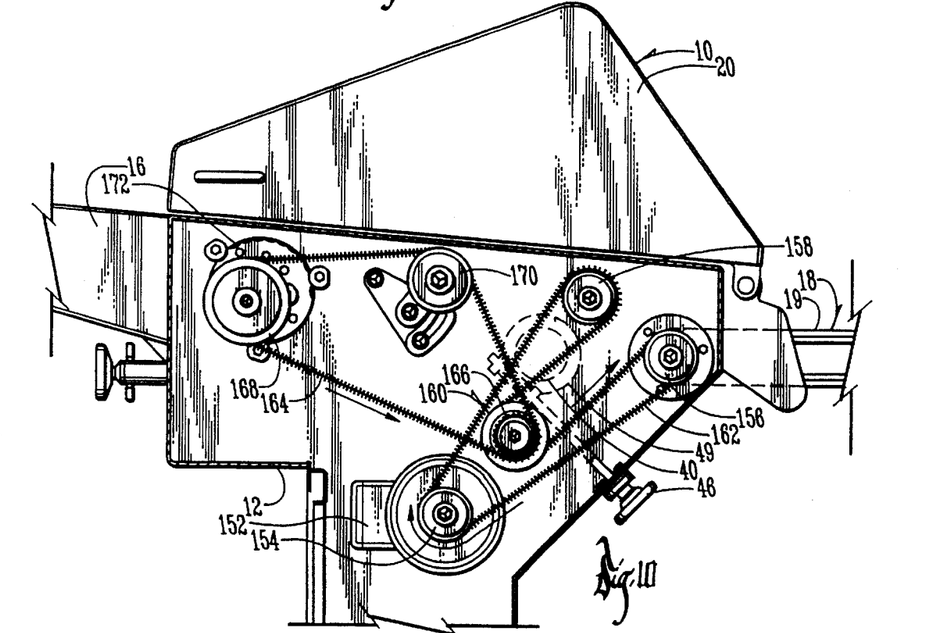
FIG. 10 is a side elevational view of the machine of FIG. 1 showing the drive components thereof.

With reference to FIG. 10, motor 152 is mounted on frame 12 and has sprocket 154 mounted on the output shaft thereof. Sprocket 156 is mounted on the drive shaft for the output conveyor 18. Sprocket 158 is mounted on the end of gripper roll 22. A dual sprocket 160 has a sprocket (sprocket 166) to drive the input conveyor 16. A toothed belt 162 extends from motor sprocket 154 upwardly and around the drive sprocket 156 for the output conveyor 18, and thence around the inner dual sprocket (not shown) of dual sprocket 160 and thence upwardly around sprocket 158 which serves to drive gripper roll 22. The belt 162 then returns to its place of origin at sprocket 154 of motor 152. Toothed belt 164 extends from sprocket 166 of the dual sprocket 160 and thence upwardly and rearwardly to sprocket 168 and thence around the idler sprocket 170 back to the point of beginning. Drive roll 146 is secured to sprocket 168. Eccentric plates 172 are associated with the sprocket 168 on opposite sides of frame 12 to be selectively adjusted to change the location of the axis of rotation of the sprockets 168. This function is performed to adjust the position of the hold down roll 98. Both eccentric plates 172 are operated simultaneously to prevent any binding of the related components while the adjustment procedure is taking place.

A chain 174 (FIG. 11) is connected to the operating shaft of drive roll 146 and is inter connected with the shaft 99 of hold down roll 98 to provide the rotational power for the hold down roll.

Figure 9:
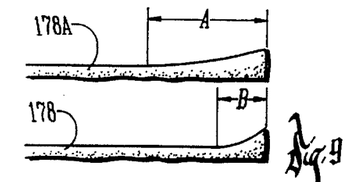
FIG. 9 is a longitudinal sectional view of removed skin accomplished by this invention as compared to removed skin of prior art machines showing the greater efficiency of the initial cut by the machine of this invention.

With reference to FIG. 8, the numeral 176 designates a conventional meat product with the numeral 178 designating a skin portion removed therefrom. FIG. 9 shows a skin portion 178 removed by the machine of this invention. The numeral 178A in FIG. 9 designates a skin portion removed by a conventional skinning machine. It will be noted that the skin portion 178 demonstrates that the removed skin portion of this machine (dimension B) moves to its normal skinning thickness at a greater speed as compared to the dimension A of the skin 178A of conventional machines. The difference in the skins 178 and 178A demonstrates that the machine of this invention will produce a meat product of higher yield, (i.e. less meat attached to the removed skin).

Figure 16:
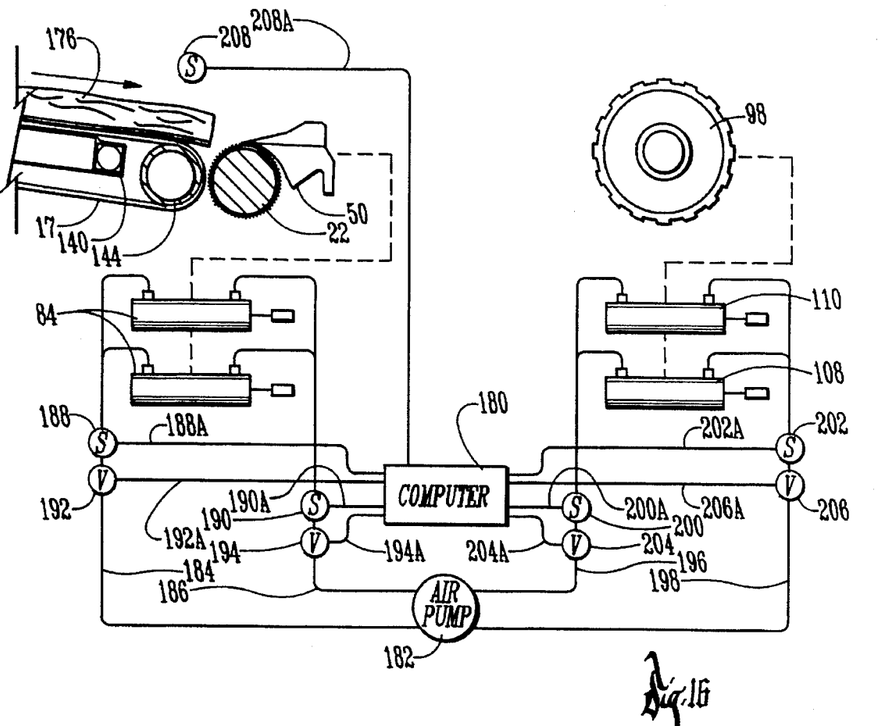
FIG. 16 is a schematic drawing showing the pneumatic and computer controls.

FIG. 16 is a schematic layout of the computer and pneumatic controls for the machine 10. A computer 180 can be mounted in compartment 14 along with an air pump 182. The precise location of both the computer and the air pump are not critical to the invention. An air line 184 extends from pump 182 to one end of the air cylinders 84. Similarly, an air line 186 extends from the air pump 182 to the other ends of cylinders 84. Air pressure sensors 188 and 190 are imposed in air lines 184 and 186 respectively. Electronic line 188A connects sensor 188 with computer 180, and electronic line 190A connects sensor 190 with the computer. Similarly, electronic air valve 192 is imposed in air line 184 and is electronically connected to computer 180 by line 192A. Electronic air valve 194 in air line 186 is electronically connected to the computer by line 194A.

Air lines 196 and 198 extend from air pump 182 to opposite ends of cylinders 108 and 110. Air pressure sensor 200 is imposed in line 196 and is connected to the computer 180 by electronic line 200A. Air pressure sensor 202 is imposed in air line 198 and is connected to computer 180 by electronic line 202A. Electronic air valve 204 is imposed in air line 196 and is connected to the computer by line 204A. Electronic air valve 206 is imposed in line 198 and is connected to the computer by line 206A.

Similarly, sensor 208 which is located in the machine in the proximity of the skinning blade assembly 50 is connected to the computer by electronic line 208A.

Sensor 208 is intended to advise the computer of the presence of an approaching slab of meat 176 to be skinned. When the meat slab engages the skinning blade assembly 50, the assembly will cause a change in the air pressure lines servicing cylinders 84 and will cause a compensating air pressure to be established in the cylinders through the valves 192 and 194 to accommodate the change in position of the skinning blade assembly 50 from the initial open "bite" position to a closed or normal skinning position. This happens instantaneously and permits the removed skin to assume the configuration of the skin 178 in FIG. 9 rather than the conventional skin configuration 178A shown in the same figure.

The computer is programmed to coordinate the movement of the hold down roll 98 with respect to the change in position of the skinning blade assembly 50 while also sensing the air pressure in lines 196 and 198 through sensors 200 and 202, and adjusting the air pressure in those lines through valves 204 and 206. This reaction influences the air pressure within cylinders 108 and 110 which actuate the hold down roller arms 94 in the same way that cylinders 84 act on the control arms 32 and skinning blade asssembly 50 to which they are connected.

The machine of this invention uses a combination of air pressure sensors and on board computer functions (not shown) which serve to sense that the meat product is approaching the gripping roll and skinning blade portions; and then to force the shoe immediately downwardly to a skinning position as the initial "bite" of the meat product takes place. It is this action that produces the skin 178 and not the skin 178A of FIG. 9. Further, this machine will enable the hold down roll 98 to move in a coordinated manner with respect to the skinning blade assembly 50 so that the hold down roll exerts downward pressure on the meat product not only during the initial bite, but throughout the skinning process, all without ever coming into contact with the skinning blade or gripper roll. Sensors typically are placed in the air lines serving the air cylinders, and are assimilated and coordinated by a conventional microprocessor typically contained within compartment 14.

Typically, adjustments of eccentrics 172 (FIG. 10) are a one time adjustment to position the hold down roll to the desired operating level. The eccentric apparatus of FIG. 12 can similarly determine the operating position of the control arms 32 and skinning blade assembly 50. The adjustment of eccentric shaft 38 (FIG. 12) is transmitted to the hold down roll 98 through the stop block 128, adjustable stop 126 and hold down roll arms 94 as shown in FIG. 13. Thus, the hold down roll will always be in its predetermined operating position regardless of the adjusted operating position of the skinning blade assembly (via control arms 32).

When the meat product 176 approaches the skinning position of FIG. 5, the hold down roll exerts downward pressure thereon. The skinning blade assembly is in the open or bite position. The control arms 32 and air cylinders 84 are then in the position of FIG. 4. As soon as the meat product 176 engages the skinning blade 52 and shoe 54, the sensors serving cylinders 84 cause the assembly 50 to instantly move to the skinning position of FIG. 7. See the corresponding change of position of the components of FIG. 6 (corresponding to the components of FIG. 7 as they have moved from the position of FIG. 4). The assembly 50 pivots on pin 56 and the angle of the assembly is guided by pins 58 in cam slots 69 in cam blocks 68 (FIG. 8).

When it is desired to clean or service the machine, the input conveyor can be moved to its folded position shown in FIG. 15. The air cylinders 108 and 110 can be disconnected as described above (FIG. 13) to move the hold down roll 98. The assembly 50 can be removed by removing blocks 128 (FIGS. 3 and 13), thence sliding the control arms 32 laterally outwardly (upwardly as viewed in FIG. 3), whereupon the assembly can be lifted upwardly as the pins 56 and 58 in the ends thereof disengage the apertures in which they are mounted. This will then give complete access to the gripping roll 22 for cleaning purposes.

It is therefore seen that this invention will accomplish at least all of its stated objectives.

What is claimed is:

1. A meat skinning machine, comprising, a frame, a gripping roll rotatably mounted on said frame, a pair of control arms having upper and lower ends pivotally secured to said frame at their lower ends, with their upper ends normally extending above said gripping roll, a skinning blade assembly having opposite ends secured to the upper ends of said control arms so that pivotal movement of said control arms will move said skinning blade assembly towards or away from gripping roll, an air cylinder means connected to said control arms to selectively pivot said arms with respect to said frame, power means on said frame operatively connected to said gripping roll to grip a meat product and move said meat product into an operative skinning position with respect to said skinning blade assembly; and an adjustable cam means being mounted within said machine and bearing against said control arms to limit the pivotal movement of said skinning blade assembly with respect to said gripping roll.

2. The device of claim 1 wherein the lower ends of said control arms are secured to said frame by eccentric elements whereby the position of said control arms and said skinning blade assembly with respect to said gripping roll can be selectively adjusted.

3. The device of claim 1 wherein the lower ends of said control arms are adjustably secured to said frame to permit the pivotal position of said control arms and said skinning blade assembly with respect to said gripping roll can be selectively adjusted.

4. The device of claim 3 wherein a non-linear eccentric means adjustably secures the lower ends of said control arms to said frame.

5. The device of claim 1 wherein a hold down roll is movably and rotatably mounted on said frame in spaced parallel relation to said gripping roll to exert downward pressure on a meat product moving into operative engagement with said skinning blade assembly.

6. The device of claim 1 wherein an input belt conveyor is mounted on said frame upstream of said gripping roll, and said power means is operatively connected to both said hold down roll and said input belt conveyor.

7. The device of claim 6 wherein said input belt conveyor is inclined from a horizontal plane and extends downwardly towards said gripping roll.

8. The device of claim 7 wherein coupling means connects said hold down roll and said control arms so that when said control arms move the position of said skinning blade assembly, said hold down roll will move similarly to substantially maintain the relative positions of said hold down roll and said skinning blade assembly.

9. The device of claim 5 wherein said hold down roll is movably an rotatably mounted on said frame in spaced parallel relation to said gripping roll to exert downward pressure on a meat product moving into operative engagement with said skinning blade assembly, said hold down roll having a narrow center portion and opposite end portions, resilient hold down disk elements on said opposite end portions having tapered peripheral surfaces, with said center portion being free from disk elements having a tapered peripheral surface.

10. The device of claim 6 wherein said power means applies rotational power to said input belt conveyor at a horizontal shaft supported at its ends by bearing elements, and said hold down roll is supported by support arms pivotally supported by said bearing elements.

11. The device of claim 10 wherein said bearing elements are adjustably secured to said frame.

12. The device of claim 10 wherein said bearing elements are adjustably secured to said frame by an eccentric means.

13. The device of claim 4 wherein a hood is pivotally mounted to extend over the top of said frame, a pair of air cylinders with upper and lower ends, stub arms on said hood pivotally secured to said air cylinders at the lower ends thereof to hold said air cylinders under tension in an operating position when said hood is in a closed position on top of said frame, said air cylinders being detachably secured at their upper ends to said hold down roll and maintained in an operating position by said stub when said hood is in said closed position, said stub arms moving to a tension release position with respect to said air cylinders when said hood is to an open position.

14. The device of claim 5 wherein a hood is pivotally mounted to extend over the top of said frame, stub arms on said hood coupled to said hold down roll by length expandable elements to normally be under tension to urge said hold down roll downwardly against a meat product to be skinned, said stub arms moving to a tension release position with respect to said length expandable elements when said hood is moved to an open position.

15. The device of claim 1 wherein adjustment elements are on the ends of said skinning blade assembly to permit said skinning blade assembly to be slightly misaligned with said gripping roll to enhance the skinning of a meat product which varies in thickness in a lateral direction with respect to its longitudinal direction of travel with respect to said gripping roll.

16. The device of claim 1 wherein said skinning blade assembly comprises a skinning blade mounted on a shoe, said shoe having a compound arcuate surface generally complimentary in shape to the outer surface of said gripping roll but being comprised of two arcuate surface portions having different radii.

17. The device of claim 1 wherein a first sensor means is on said frame to sense the presence of a meat product approaching said skinning blade assembly, said first sensor means being operatively connected to a control means to cause said air cylinder means to move said skinning blade assembly instantly from an open bite position with respect to said gripping roll as said meat product engages said gripping roll to a normal skinning position more closely adjacent said gripping roll.

18. The device of claim 17 wherein said first sensor means and said control means include air pressure sensors.

19. The device of claim 18 wherein said first sensor means and said control means include a computer.

20. The device of claim 17 wherein a hold down roll is movably rotatably mounted on said frame in spaced parallel relation to said gripping roll to exert downward pressure on a meat product moving into operative engagement with said skinning blade assembly; and said control means is operatively connected no said hold down roll to move said hold down roll downwardly on said meat product to maintain pressure thereon when said skinning blade assembly is moving into said normal skinning position while maintaining said hold down roll out of engagement with said skinning blade assembly throughout said skinning operation.

21. The device of claim 1 wherein said air cylinder means are length adjustable.

22. The device of claim 1 wherein cam blocks are mounted on said frame adjacent the ends of said skinning blade assembly, a cam slot in said cam blocks, pins on the ends of said skinning blade assembly extending into said cam slots so that said skinning blade assembly can be moved to various positions with respect to said gripping roll to permit said skinning blade assembly to remove skin of various thicknesses from said meat product.

23. The device of claim 1 wherein an input belt conveyor is disposed on a foldable conveyor frame on said frame upstream of said gripping roll, said frame having a first unfolded extended longitudinal operational position, and being adapted to be moved to an inoperable folded position.

24. The device of claim 1 wherein the lower ends of said control arms are also laterally slidably mounted on said frame between an inner operable position and outer inoperable position, a control block detachably mounted on said frame and engaging said control arms to hold said control arms in said inner position laterally extending pins on the opposite s of said skinning blade assembly slidably ending into apertures in the upper ends of said control arms when said control arms are in said inner position, and which are slidably detached from said apertures when said control arms are moved to said outer position.

25. A meat skinning machine, comprising, a frame, a gripping roll rotatably mounted on said frame, a pair of control arms having upper and lower ends pivotally secured to said frame at their lower ends, with their upper ends normally extending above said gripping roll, a skinning blade assembly having opposite ends secured to the upper ends of said control arms so that pivotal movement of said control arms will move said skinning blade assembly towards or away from gripping roll, an air cylinder means connected to said control arms to selectively pivot said arms with respect to said frame, power means on said frame operatively connected to said gripping roll to grip a meat product and move said meat product into an operative skinning position with respect to said skinning blade assembly;

a hold down roll being movably and rotatably mounted on said frame in spaced parallel relation to said gripping roll to exert downward pressure on a meat product moving into operative engagement with said skinning blade assembly; and a hood being pivotally mounted to extend over the top of said frame, stub arms on said hood coupled to said hold down roll by length expandable elements to normally be under tension to urge said hold down roll downwardly against a meat product to be skinned, said stub arms moving to a tension release position with respect to said length expandable elements when said hood is moved to an open position.

26. The device of claim 25 wherein an adjustable cam means is mounted within said machine and bears against said control arms to limit the pivotal movement of said skinning blade assembly with respect to said gripping roll.

27. A meat skinning machine, comprising, a frame, a gripping roll rotatably mounted on said frame, a pair of control arms having upper and lower ends pivotally secured to said frame at their lower ends, with their upper ends normally extending above said gripping roll, a skinning blade assembly having opposite ends secured to the upper ends of said control arms so that pivotal movement of said control arms will move said skinning blade assembly towards or away from gripping roll, an air cylinder means connected to said control arms to selectively pivot said arms with respect to said frame, power means on said frame operatively connected to said gripping roll to grip a meat product and move said meat product into an operative skinning position with respect to said skinning blade assembly;

a hold down roll being movably and rotatably mounted on said frame in spaced parallel relation to said gripping roll to exert downward pressure on a meat product moving into operative engagement with said skinning blade assembly; and said hold down roll being movably and rotatably mounted on said frame in spaced parallel relation to said gripping roll to exert downward pressure on a meat product moving into operative engagement with said skinning blade assembly, said hold down roll having a narrow center portion and opposite end portions, resilient hold down disk elements on said opposite end portions having tapered peripheral surfaces, with said center portion being free from disk elements having a tapered peripheral surface.

28. A meat skinning machine, comprising, a frame, a gripping roll rotatably mounted on said frame, a pair of control arms having upper and lower ends pivotally secured to said frame at their lower ends, with their upper ends normally extending above said gripping roll, a skinning blade assembly having opposite ends secured to the upper ends of said control arms so that pivotal movement of said control arms will move said skinning blade assembly towards or away from gripping roll, an air cylinder means connected to said control arms to selectively pivot said arms with respect to said frame, power means on said frame operatively connected to said gripping roll to grip a meat product and move said meat product into an operative skinning position with respect to said skinning blade assembly; and cam blocks being mounted on said frame adjacent the ends of said skinning blade assembly, a cam slot in said cam blocks, pins on the ends of said skinning blade assembly extending into said cam slots so that said skinning blade assembly can be moved to various positions with respect to said gripping roll to permit said skinning blade assembly to remove skin of various thicknesses from said meat product.

* * * * *

UNITED STATES PATENT AND TRADEMARK OFFICE
CERTIFICATE OF CORRECTION

PATENT NO. : 5,558,573
DATED : September 24, 1996
INVENTOR(S) : Vincent L. Basile, II; Brent M. Veldkamp; Douglas N. McCloskey; and David S. Hamblin It is certified that error appears in the above-identified patent and that said Letters Patent is hereby corrected as shown below:

Column 7, line 48, strike the numeral "1" and insert - 4 -.

Column 8, line 21, after the word "stub" insert the word - arms -.

Column 9, line 23, after the word "position" insert a - , -.

Column 9, line 24, strike the letter "s" and insert the word - ends -.

Signed and Sealed this

First Day of April, 1997

BRUCE LEHMAN

*Attest:*

*Attesting Officer*

*Commissioner of Patents and Trademarks*